Nov. 2, 1971  J. FLATT  3,616,616
PARTICLE SEPARATOR, ESPECIALLY FOR USE IN
CONNECTION WITH JET ENGINES
Filed March 11, 1968  2 Sheets-Sheet 1

INVENTOR.
Joseph Flatt
BY

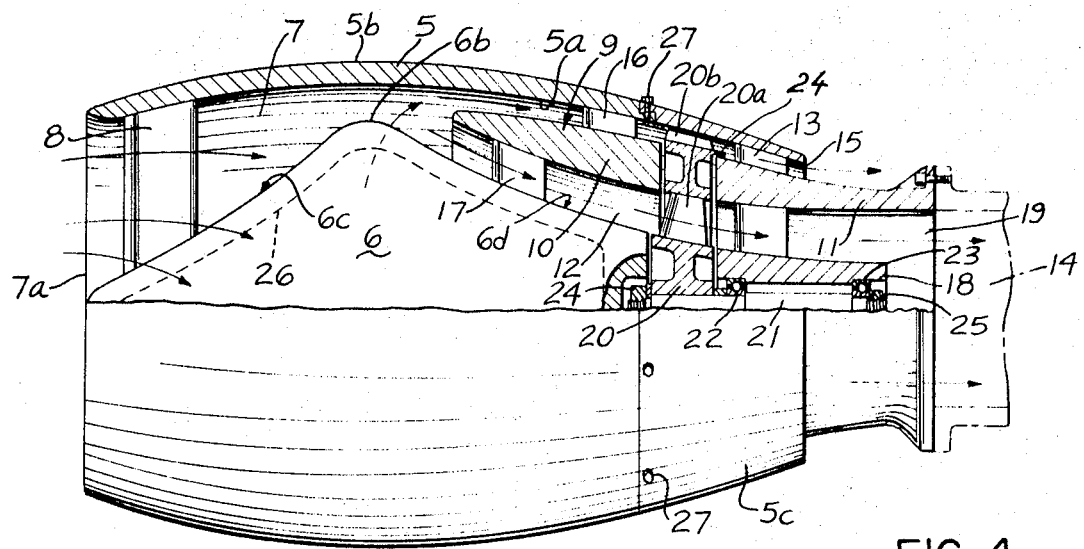
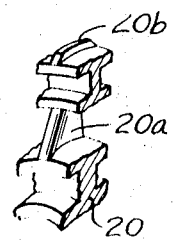
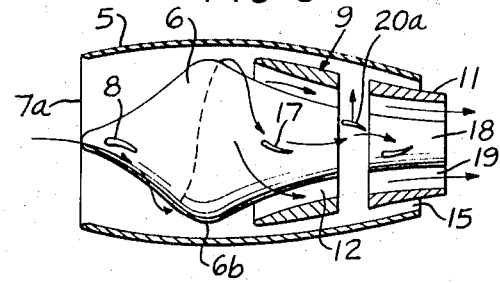
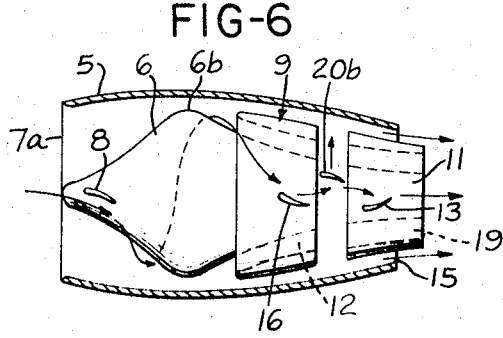

United States Patent Office 3,616,616
Patented Nov. 2, 1971

3,616,616
PARTICLE SEPARATOR, ESPECIALLY FOR USE
IN CONNECTION WITH JET ENGINES
Joseph Flatt, Dayton, Ohio, assignor to Tech
Development, Inc., Dayton, Ohio
Filed Mar. 11, 1968, Ser. No. 712,190
Int. Cl. B01d 45/12
U.S. Cl. 55—306
11 Claims

ABSTRACT OF THE DISCLOSURE

A particle separator, especially for use in connection with a gas turbine, which comprises cowl means having an inlet end and outlet end and together with a deflector body arranged within said cowl means in spaced relationship thereto forms passage means extending from said inlet means to said outlet means while the outer contour of said deflector body ascends from said inlet end to a hump on the deflector body between said inlet and outlet ends, that portion of said passage means which is located between the outlet end of said cowl means and the said hump being divided into an outer passage for discharging separated particle means to the atmosphere and to an inner passage for discharging air to a turbine engine to which the deflector is connected.

---

The present invention relates to particle separators, especially for use in connection with gas turbines, to protect such engines against premature wear due to ingested sand and dust.

It is a well-known fact that sand and dust stirred up by gas turbine powered helicopters during the run-up and take-off of such helicopters enter and pass through the turbine engine and bring about the necessity of having to exchange the engines prematurely for repair or replacement.

Therefore, numerous efforts have been made heretofore to catch the sand and dust before it can enter the turbine engine. The best heretofore known system which is most effective in catching and removing foreign matter entrained in the engine inlet airstream consists in the installation of an air particle separator which comprises approximately 1300 so-called strata tubes per engine, each tube having a diameter of about 1.5″ and a length of about 4″. While separators of this known design have proved successful, they are rather expensive and relatively space-consuming, and it is, therefore, an object of the present invention to provide a protector system for gas turbines of the above-mentioned general type which is greatly simplified over heretofore known systems of the type involved.

It is another object of this invention to provide a protective system for gas turbines as set forth in the preceding paragraph, which will require a minimum of space, will be of light weight, and can easily be installed and removed.

These and other objects and advantages of the invention will appear more clearly from the following specification in connection with the accompanying drawings, in which:

FIG. 4 illustrates the separator according to the present invention on a still larger scale than FIG. 2, partially in view and partially in section, said section being taken along the line IV—IV of FIG. 2;

FIG. 4a is a fragmentary view of a rotor forming part of the separator and equipped with inner and outer vanes for conveying the air to the jet engine and the separated bodies to the atmosphere;

FIG. 5 shows the clean air flow pattern, and

FIG. 6 illustrates the particle flow.

Taking advantage of the well-known laws of centrifugal force according to which the heavier particles or bodies are thrown radially outwardly at a greater force and over a considerably greater radius than is the case with light particles, the separator according to the present invention is characterized primarily by a housing or cowl, preferably barrel-shaped, which has coaxially arranged therein and in spaced relationship thereto a core or deflector body with an outer wall surface that intermediate the ends of said deflector body comprises an annular hump defining a passage with the inner adjacent wall portion of said cowl, while said outer wall surface of said deflector body tapers from said hump toward both ends of said deflector body.

The hump in combination with the ascent toward the hump represents one of the most important features of the present invention inasmuch as this combination aids and increases the centrifugal effect of the entire separator in accelerating the movement of the particles entrained in the air toward the inner wall of the cowl within a relatively short axial distance of the separator thereby reducing the space requirement and the weight for the separator to a minimum. The separator according to the invention is furthermore characterized in that between said hump and that end of said deflector body which in assembled condition of the said separator will face the jet engine inlet, there is provided an annular partitioning or dividing structure which, while being radially spaced both from the adjacent wall surface portion of said deflector body and the adjacent inner wall surface portion of said cowl respectively defines therewith outer passage means leading into the atmosphere, and inner passage means adapted to be connected to the air inlet of a jet engine. The said inner and outer passage means communicate with said passage between said hump and the radially adjacent inner wall portion of said deflector body, blade means operable by the air flow induced by the jet engine to which the separator is to be connected extending into said outer and inner passage means for respectively conveying foreign particles in said outer passage means to the outside of the separator, and air in said inner passage means to the intake of the respective jet engine.

Figure 1:
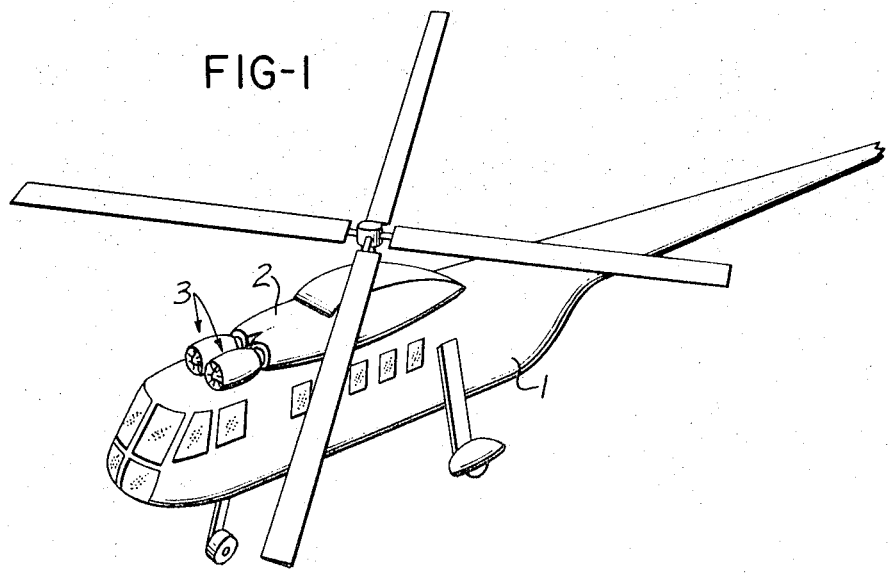
FIG. 1 is a perspective view of a helicopter driven by twin jet engines each equipped with a separator according to the present invention.
Figure 2:
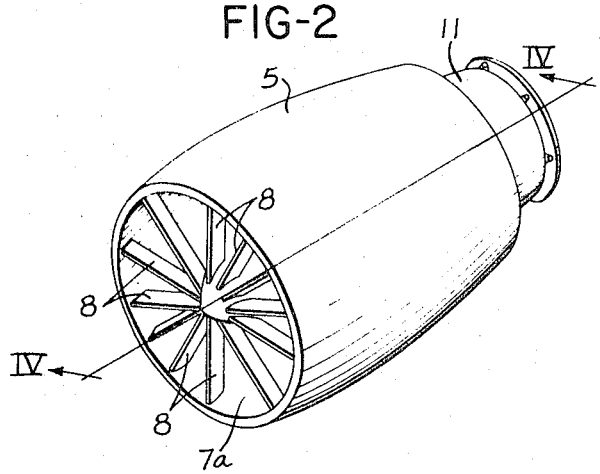
FIG. 2 illustrates on a somewhat larger scale than FIG. 1 a perspective view of the cowl or housing of the separator according to the invention with a view of the inlet vanes.
Figure 3:
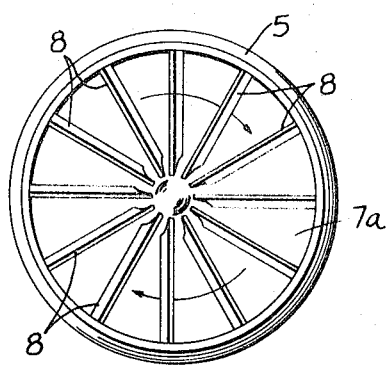
FIG. 3 is a front view of the inlet vanes with the arrows indicating the flow of air.

Referring now to the drawings in detail, FIG. 1 shows a helicopter 1 with twin jet engines 2 having respectively connected to the air inlet thereof separators generally designated 3. The separator 3 is more clearly shown in FIG. 4 and comprises a cowl 5 and a deflector body 6 with an annular hump 6b. As will be seen from FIG. 4, the deflector body 6 has its outer wall surfaces 6c and 6d tapering from said hump in opposite direction toward the respective ends of said deflector body so that the passage 7 defined by the inner wall surface of the cowl 5 and the outer wall surface of the deflector body 6 has a fairly wide cross-section at the entrance end 7a of the passage, then narrows down toward the hump 6b and again widens toward the other or outlet end of the cowl and deflector body. At the left-hand side (with regard to FIG. 4) the deflector 6 and cowl 5 are interconnected by stationary swirl vanes 8 which are best shown in FIGS. 2 and 3. FIG. 3 shows the shape of the vanes and also clearly shows that the mixture of air and foreign bodies drawn into the passage 7 will flow in clockwise direction, as indicated by the arrows in FIG. 3. It is, however, to be understood that it is by no means necessary that the vanes must be shaped for clockwise movement of the intake but can also be shaped for counter-clockwise movement. The purpose of the vanes 8 is to create swirl.

As will furthermore be seen from FIG. 4, between the outer wall surface portion 6d of the deflector and the radially adjacent inner surface of the cowl 5 and in spaced relationship to the latter and said surface 6d there is provided a partitioning or dividing structure, generally designated 9, which comprises an inner annular member 10 and an outer annular member 11. The inner and outer contours of said annular members 10 and 11 are streamlined and together with the respective opposite deflector surface 6d and cowl surface 5a define two passages 12 and 13 of which the passage 12 having the wider cross-section communicates with the engine inlet 14 indicated in dot-dash lines, as will be more fully explained further below, while the narrower passage 13 communicates through an annular opening 15 with the atmosphere.

The annular member 10 is connected to the cowl 5 by outer anti-swirl vanes 16 and is connected to the deflector by inner anti-swirl vanes 17. These anti-swirl vanes 16 and 17 have the purpose of converting to non-swirl flow the particle flow passing through the passage 13 and the air flow passing through the passage 12.

As will also be seen from FIG. 4, the annular members 10 and 11 are spaced from each other in the longitudinal direction of the separator. It will furthermore be seen that the right-hand end (with regard to FIG. 4) of the deflector body 6 is axially inwardly offset with regard to the plane defining the right-hand end of the cowl 5. However, in axially spaced relationship to the right-hand end of deflector body 6 there is provided an inner sleeve or annular member 18 the outer contour of which substantially forms an extension of the outer wall surface 6d so as together with the inner wall surface of annular member 11 to form a passage 19 which represents a continuation of the passage 12 and leads into the air engine inlet 14. In the gap between the members 10 and 11 and the gap between the deflector body 6 and the sleeve 18 there is provided a rotor 20 which is rotatably connected to a shaft 21 which in turn is journalled in anti-friction bearings 22 and 23. The shaft is firmly clamped against the inner race rings of said anti-friction bearings by means of nuts 24 and 25 on the respective threaded ends of shaft 21.

The rotor 20 has a first or inner blade or vane section 20a which is in alignment with the adjacent portions of the passages 12 and 19 and has a second or outer blade or vane section 20b which is in alignment with the passage 13 for discharging the separated particles or foreign bodies. The rotor 20 is driven by the air flowing in passage 12 due to its action on vanes 20a as a result of the velocity imparted to the air by the jet engine in the direction toward the latter. The vanes 20b forming part of the rotor 20 then propel the air in passage 13, such air and entrained particles discharging through the annular opening 15.

The operation of the separator according to the present invention is as follows: It may be assumed that the separator has been connected to a jet engine, as shown in FIG. 1, and that the jet engine has been started. Operation of the engine and related equipment stirs up dust and particles and induces an insuction of air entraining such particles to the inlet end of the cowl 5 and the passage 7. The swirl created by the swirl vanes 8 causes the air and dust particles entrained therein to be centrifuged outwardly in the direction toward the inner wall surface 5a of the cowl 5. The air passes along the deflector surface 6c over and along the hump 6b and to a major part will flow into the passage 12, whereas the remaining part of the air together with the entrained particles in passage 7 is conveyed by the outer vane section 20b of rotor 20 into and through the passage 13 toward the outside of the separator into the atmosphere. The air in passage 12 passes through vanes 20a thereby imparting energy to rotor 20 so as to rotate the same. From here the air passes through passage 19 into the jet engine.

It will thus be evident from the above that an important feature of the present invention consists in that the rotor 20 does not require additional positive driving means for rotating the rotor 20 but that the rotation of rotor 20 is brought about by the velocity imparted to the air by the action of the jet engine.

FIG. 5 shows the clean air flow pattern while FIG. 6 shows the particle flow path.

According to a further development of the present invention, the cowl is composed of a plurality of sections, for instance in conformity with FIG. 4, of two sections, viz. the larger left-hand (with regard to FIG. 4) section 5b and the shorter right-hand section 5c. Both sections 5b and 5c are detachably connected to each other along a stepped end face and held together in any convenient manner, for instance, by screws 27. This arrangement greatly facilitates the assembly and disassembly of the separator, as will be evident from the drawing.

According to still another feature of the present invention, the rotor 20 is at the level of the inner wall surface of passage 13 provided with a lip 24 extending slightly into said passage 13 for reducing the possibility of feedback of the separated particles.

It may also be mentioned that for purposes of saving weight as far as possible, the deflector 6 is preferably made hollow by providing a cavity 26.

It is, of course, to be understood, that the present invention is, by no means, limited to the particular arrangement shown in the drawings, but also comprises any modifications within the scope of the appended claims.

Thus, it is not under all circumstances necessary to provide the swirl vanes 8 since the passage section from the entrance end 7a to the hump 6b by itself imparts a centrifugal effect to the air entering said passage section. Furthermore, the surface 6c from the entrance end to the hump could be rifled for producing the centrifugal effect. However, the preferred arrangement which has proved most effective is the provision of the swirl vanes 8.

What I claim is:

1. A particle separator for a gas turbine engine, comprising, duct-like cowl means having an inlet end and an outlet end, deflector means having intermediate its longitudinal extremities a radially projecting hump, said deflector means being positioned within and in a peripherally spaced relation to said cowl means to provide therewith, between said inlet end and said outlet end, longitudinally extending passage means, said passage means including a first section having a configuration reducing in cross sectional area from said inlet end to said hump and a second section expanding toward said outlet end, there being partition means in said second section between said deflector means and said cowl means dividing said second section into an outer channel adjacent said cowl means and an inner channel, said separator being adapted for mounting to communicate the exit end of said inner channel directly with the air inlet of a gas turbine engine, said partition means having a shell-like form including axially extending longitudinally spaced shell-like portions, rotor means positioned within the limits of said cowl means to have portions thereof align with and form a continuation of said partition means and of said deflector means, said rotor means including connected vane means bridging said inner channel, said rotor means further including other vane means bridging said outer channel, means mounting said rotor means for rotation within said cowl means, said cowl means having a configuration and spacing relative said hump and said partition means to provide that on inflow of fluid and undesirable particles through said inlet end of said cowl means a portion of the fluid including undesirable particles will be induced to move peripherally outward past said hump and directly into said outer channel whereas the balance of fluid will flow along said hump to and through said inner channel, in an operative relation to at least a portion of said rotor vanes, and be adapted thereby to pass directly therefrom to the air inlet of a connected gas turbine engine.

2. Apparatus as in claim 1 characterized by said partition means being longitudinally extended to project beyond the outlet end of said cowl means and providing therein adapter means for connection thereof to means defining the air inlet of a gas turbine.

3. Apparatus as set forth in claim 1 characterized by said partition means in said second section of said passage means commencing at a point adjacent said hump and having an aerodynamic configuration and vane means of a fixed nature connected between the outermost surface of said partition means and the inner surface of said cowl means and between the innermost surface of said partition means and the outermost surface of said deflector means, said vane means being of a form and so positioned to eliminate swirl tendencies in the flow of fluid through said inner and outer channel means.

4. Apparatus as in claim 1 in which said cowl means has a shell form of maximum internal diameter at a point intermediate its ends from which point said shell means is formed to converge to its respective ends, said hump being located to coincide approximately with the portion of said cowl means of maximum internal diameter and the innermost extremity of said partition means being positioned immediately adjacent said hump to define therewith the inlet to said inner channel.

5. Apparatus as in claim 1 characterized by said rotor means having in cooperation therewith means to inhibit movement of particles from said outer channel to said inner channel.

6. A particle separator according to claim 1 wherein swirl vanes extend between said deflector means and said cowl means at the inlet end of said cowl means, in advance of said hump, said swirl vanes being disposed to apply a circular swirling motion to fluid moving inwardly thereof to facilitate the movement of undesirable particles in the fluid outwardly of said hump and influence their direct passage to and through said outer channel as defined by said partition means.

7. Apparatus as in claim 6 characterized by said partition means at the entrance end of said inner and outer channel being positioned in a relatively adjacent and closely spaced relation to said hump.

8. A particle separator for positioning in line with and in advance of the inlet end of a gas turbine engine, including a barrel-shaped cowl open at its opposite ends, said end forming an inlet and an outlet with respect to the flow of air through said cowl to a related engine inlet, a deflector longitudinally disposed in said cowl to form therewith an annular path for flow therethrough of air, one end of said deflector facing said inlet and presenting thereto a surface expanding and inclining outwardly in the path of incoming air, the other end of said deflector facing said outlet and presenting a declining surface to outgoing air, an intermediate portion of said deflector being humped, partition means of a tubular tapering configuration received in said cowl beyond the humped portion of said deflector, said partition means dividing said annular flow path beyond said humped portion into inner and outer flow passages, said partition means including leading and trailing portions relative to the direction of air flow, said trailing portion being constructed as a continuation of the leading portion and being adapated for connection to a related engine inlet, said outer flow passage opening through the outlet end of the cowl around the projecting extremity of said trailing portion to atmosphere and said inner flow passage being adapted to communicate within said trailing portion with a related engine inlet, and a rotor mounted for free rotation within said cowl, portions of which rotor provide a part of said partition means, said rotor including in connection therewith vanes which intersect said flow passages, through the medium of which vanes said rotor is adapted to be rotated by air moving through said cowl and said annular flow path and under the influence of the operation of a related engine.

9. A particle separator according to claim 8 characterized by said deflector having the other end thereof terminate short of the cowl outlet and said deflector having in end spaced relation thereto an extension presenting a continuation of the outer surface thereof and there being intermediate said deflector and said extension the central portion of said rotor, portions of said rotor defining a portion of said inner flow passage and another portion thereof defining with said cowl means a portion of said outer flow passage and including means which inhibits communication of air in said outer flow passage with said inner flow passage.

10. A particle separator according to claim 8 characterized by said partition means being formed of plural sections intermediate adjacent of which is positioned said rotor means, and the advance edge of said leading portion of said partition means positioning in adjacent and axially spaced relation to said hump portion of said deflector to define the inlet to said inner flow passage in a path following the contour of the declining surface of said deflector.

11. A particle separator according to claim 10 characterized by swirl vanes at the inlet end of said cowl connecting to the said one end of said deflector, at the initial portion of the outwardly inclining surface thereon, and anti-swirl vanes extending between said partition means and said deflector and said cowl means, the said trailing portion of said partition means being arranged to project beyond said cowl means and provide adapter means for inter-connection thereof to the inlet of a related engine.

References Cited
UNITED STATES PATENTS

| | | | |
|---|---|---|---|
| 710,626 | 10/1902 | Smith | 55—404 |
| 1,447,554 | 3/1923 | Jones | 55—396 |
| 1,870,216 | 8/1932 | Baldwin | 55—404 |
| 2,106,589 | 1/1938 | Bigger et al. | 55—399 |
| 2,375,203 | 5/1945 | Appeldoorn | 55—406 |
| 2,482,642 | 9/1949 | Sylvan | 55—408 |
| 2,569,909 | 10/1951 | Umney | 55—347 |
| 2,616,519 | 11/1952 | Crankshaw et al. | 55—396 |
| 3,273,324 | 9/1966 | Jennings | 55—404 |
| 3,276,189 | 10/1966 | Sylvan | 55—401 |
| 3,290,877 | 12/1966 | Millar | 60—39.09 |
| 3,361,336 | 1/1968 | Fog | 230—122 A |
| 3,444,672 | 5/1969 | Alsobrooks | 60—39.09 |

FRANK W. LUTTER, Primary Examiner

B. NOZICK, Assistant Examiner

U.S. Cl. X.R.

55—394, 404, 416, 457, 463; 60—39.09 P; 415—79